Aug. 31, 1926.
E. H. SHAFF
CONNECTING ROD
Filed Sept. 10, 1923
1,598,398
Fig. 1.
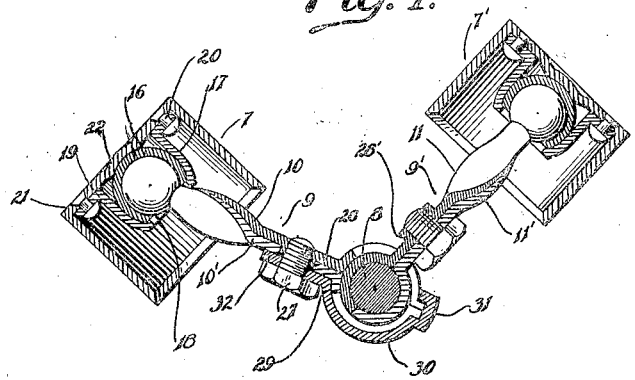
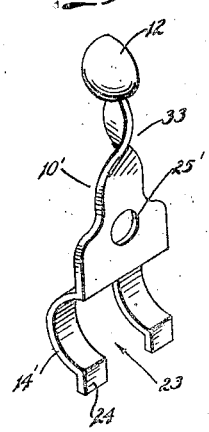
Fig. 2.
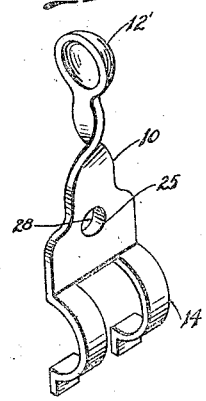
Fig. 3.
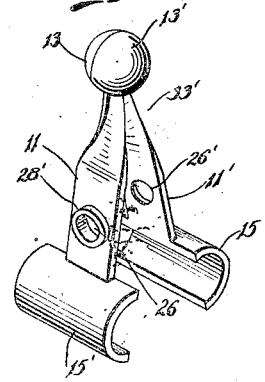
Fig. 4.
Fig. 5.
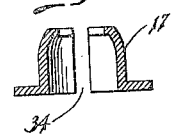
Fig. 6.
Inventor:
Ernest H. Shaff
By Glindahl, Parker & Coulson
Attys Patented Aug. 31, 1926.

1,598,398

UNITED STATES PATENT OFFICE.

ERNEST H. SHAFF, OF GRAND HAVEN, MICHIGAN, ASSIGNOR TO WILLIAM H. KELLER, INC., OF GRAND HAVEN, MICHIGAN, A CORPORATION OF MICHIGAN.

CONNECTING ROD.

Application filed September 10, 1923. Serial No. 661,734.

The invention pertains to connecting rods adapted primarily for use in pneumatic tools of the type comprising one or more pairs of cylinders in which the cylinders of each pair are arranged at an angle to each other and are each provided with pistons connected to a common crank shaft.

The object of my invention is to provide an improved construction for the means which serves to connect the pistons of each pair of cylinders to the crank shaft.

More specifically stated, the object of the invention is to provide a construction for the connecting rods such that they may be manufactured at a very low cost, that they shall be of light weight, and that they shall at the same time be of a durable character, there being no transverse joints between the crank shaft and the wrist bearings in the pistons.

I attain the object of the invention thus generally stated by forming the connecting rods from two substantially similar members in the nature of complementary sections stamped or pressed out of suitable metal stock, such as sheet steel, so as to provide at the opposite ends of the members semi-spherical and semi-cylindrical portions. The two members of each of the rods are then secured together, to form in effect a one-piece rod having a spherical or ball bearing at one end adapted for connection with the piston, and a cylindrical or sleeve-like bearing at the other end adapted for connection with a journal of the crank shaft.

In the accompanying drawings I have illustrated a preferred form of my invention.

Figure 1 is a vertical sectional view through a pair of pistons and a crank shaft, showing the connecting rods partially in section.

Figs. 2 and 3 are respectively perspective views of the two complementary sections of the connecting rod for one of the pistons.

Fig. 4 is a perspective view showing the two sections of the rod for the other piston, in partially assembled relation.

Fig. 5 is a sectional view illustrating the construction of a preferred form of wrist bearing or socket member before assembling.

Fig. 6 is a similar view of the retaining member for the socket member.

I have shown in Fig. 1 a pair of pistons 7 and 7' arranged as though they were contained in cylinders disposed substantially at right angles to each other, and connected to a common journal of a crank shaft 8 by means of connecting rods 9 and 9' constructed in accordance with my invention.

The rods 9 and 9' are essentially similar in construction except that the rod 9 has its cylindrical or sleeve bearing, at the lower end thereof, constructed to receive within it the corresponding bearing of the rod 9'. Thus each of the rods comprises a pair of complementary sections 10 and 10', and 11 and 11'; and each of said members is constructed to provide at its upper end a semi-spherical bearing or ball portion 12 and 12', and 13 and 13', and at their lower ends semi-cylindrical bearing portions 14 and 14' and 15 and 15'.

To receive the semi-spherical portions at the upper ends of each of the rods and clamp them together in such a way as to provide a spherical or ball bearing, I employ in each instance a socket member 16. This member may be formed from a flat piece of sheet metal, first, into the shape of a cup (Fig. 5) having a rounded bottom and an open end. In assembling the parts the open end is forced around the spherical bearing member as shown clearly in Fig. 1, whereby to hold the two sections thereof together.

The socket member 16 is enclosed within a retaining member 17, open at its lower end as at 18 to receive the shank of the rod and allow sufficient play therefor to permit of the unrestricted reciprocation of the piston. At its upper end said member 17 is flanged outwardly as at 19 and secured as by means of rivets 20 entered through the flange 19 and the closed end wall 21 of the piston. Said wall 21 may, if desired, be shaped as as 22 to provide a spherical depression for the upper end of the socket member 16.

The cylindrical or sleeve bearing for the rod 9, as aforesaid, is constructed to receive within it the corresponding bearing of the rod 9'. Thus each of the portions 14 and 14' of the two members of the rod 9 are cut away centrally thereof to form a slot 23 open at its lower end, and further, said portions 14 and 14' have depending flanges or lugs 24 for use in fastening the parts together in a manner to be presently described.

The portions 15—15' (Fig. 4) of the rod 9' on the other hand are made plain but of a somewhat reduced size so as to fit snugly within the bearing formed by the portions 14—14'.

Approximately midway between the ends of each of the rods the respective members thereof are apertured as at 25—25', and 26—26', whereby to receive a fastening bolt 27. Said bolt is arranged to be threaded into one of the members and preferably I form that one, in each case, with a boss 28 or 28', in order better to provide for the threaded engagement between the bolt and the member. In the case of the rod 9, the boss 28 is shown as projecting through the aperture 25, which is enlarged to receive it; and in case of the rod 9' the boss 28 is shown as projecting outwardly.

To insure that the parts shall be maintained in operative association I provide in addition to the bolts 27 a clip or clasp 29 (Fig. 1). This clip comprises a semi-cylindrical portion 30 having a hooked end 31 adapted to receive the lugs 24 projecting from the members 10 and 10' of the rod 9, and extending upwardly from the cylindrical portion 30 the clip has an apertured flap portion 32 whereby it may be secured to the rod 9 by the bolt 27.

Referring now to Figs. 1 and 3, it will be observed that in the case of each of the rods 9 and 9' the members from which these rods are formed are twisted intermediate their ends, as at 33 and 33', through a quarter turn, so that the inner faces of the ball portions 12 and 12', and 13 and 13', are disposed substantially at right angles to the inner faces of the semi-cylindrical portions 14—14' and 15—15'. The reason for this construction is that it facilitates the assembling of the parts. Thus it will be observed from Fig. 4 that it allows the portions of the cylindrical bearing to be separated to receive the crank shaft after the portions of the ball bearing have been received into and secured in position within the socket member 16 and retainer member 17. This permits of the assembling of the connecting rods with the pistons before connecting the rods to the crank shaft.

The retainer member 17, as shown in Fig. 6, is preferably provided with a slot 34 in one side adapted to receive the shank of the connecting rod, thus permitting the ball members of the rods to be first assembled into the socket members 16, and then inserted into the retainer member 17 before the latter is secured in position in the piston.

It will be seen that each of the rods consists essentially of the two elongated members only, the line of joinder running lengthwise of the rod. Consequently there is an absence of transverse joints between the bearing members of the respective rods, and an attendant freedom from the possibility of disjoinder or separation of the opposite ends of the rod.

Moreover, the parts are made entirely of sheet metal, with the exception of the bolts 27, being stamped or pressed from steel in sheet form. Hence the weight of the rods is relatively small, while the cost of manufacture is also reduced.

An important advantage is the ease with which the parts may be assembled, due to the two-part construction of the rods themselves and to the fact that the bearing portions at the ends of each of the sections are so disposed that their joints lie in planes at right angles to each other.

These and other advantages are attained by the preferred construction and arrangement illustrated and described, but the precise construction thus set forth is not considered essential, it being contemplated that various changes may be made by those skilled in the art without departing from the spirit and scope of the invention as expressed in the appended claims.

I claim as my invention:

1. A connecting rod comprising two substantially similar sections each having a relatively flat shank or intermediate portion and bearing portions at its opposite ends adapted to coact when the sections are secured together to form complete bearing members, and means for securing said sections together comprising a clip, and lugs projecting outwardly from the bearing portions at one end of the rod, said clip having a hooked end and adapted to receive the lugs on the respective sections whereby to clamp them together.

2. A piston connecting rod comprising two complementary sections formed from sheet metal and shaped to provide coacting bearing portions at one end, and means providing connection between the rod and a piston and also serving to secure said sections together.

3. The combination with a pair of pistons and a crank shaft, of a pair of rods for connecting said pistons to said shaft, each of said rods comprising a pair of substantially similar elongated members formed from sheet metal and providing a spherical bearing at one end of the rod and a sleeve-like cylindrical bearing at the opposite end of the rod, the cylindrical bearing of one of said rods being adapted to receive within it the cylindrical bearing of the other rod, and means for securing the two members of each of said rods together and in operative association comprising a clasp adapted to engage with the ends of the members providing the outer cylindrical bearing whereby to clamp them together, and a bolt for fastening said clasp to the last mentioned rod.

4. The combination with a piston and a crank shaft, of a connecting rod constructed from two elongated substantially similar members each having its opposite ends shaped to provide bearing members for connection with the piston and the shaft respectively, the bearing member for the piston being spherical in form, and means secured to the piston providing a socket for said spherical bearing member adapted to hold the sections thereof together.

5. The combination with a piston and a crank shaft, of a connecting rod constructed from two substantially similar elongated members each constructed of sheet metal and shaped to provide at one end a semi-spherical bearing portion and at its opposite end a semi-cylindrical bearing portion, means within the piston adapted to receive and hold the semi-spherical bearing portions together, and means for clamping the semi-cylindrical portions around the crank shaft, the joints between the bearing portions at opposite ends of the rod being disposed in planes substantially at right angles to each other, and the securing means within the piston being adapted to permit the ends of the members opposite the piston end to be separated sufficiently to receive the crank shaft.

6. The combination with a piston and a crank shaft of a connecting rod constructed from two substantially similar elongated members each having a semi-spherical portion at one end and a semi-cylindrical portion at its opposite end, a socket member adapted to receive and hold the semi-spherical portions together whereby to form a spherical bearing member, said socket member being open on one side to receive the shank of the rod, and the retaining member for the socket member also having an opening therein adapted loosely to receive the shank of the rod.

7. The combination with a piston and a crank shaft, of a connecting rod constructed from two substantially similar elongated members each having a semi-spherical portion at one end and the semi-cylindrical portion at its opposite end, a socket member adapted to receive and hold the semi-spherical portions together whereby to form a spherical bearing member, said socket member being open on one side to receive the shank of the rod, and the retaining member for the socket member also having an opening therein adapted loosely to receive the shank of the rod, said retaining member having a slot in one wall adapted to pass said shank to permit the parts to be assembled.

8. The combination with a piston and a crank shaft, of a connecting rod constructed from a pair of elongated members stamped from metal in sheet form and shaped at their opposite ends to form when the parts are secured together a spherical bearing and a cylindrical sleeve-like bearing respectively, a socket member within the piston adapted to receive the spherical member, and means for securing the portions of the cylindrical bearing together, the joint between the two sections at the end adjacent the cylindrical bearing being disposed in a plane parallel with the axis of the crank shaft and the joint between the two sections at the opposite end of the rod being disposed in a plane lying substantially at right angles to the first mentioned plane so that said semi-cylindrical bearing portions may be moved outwardly in a plane perpendicular to said crank shaft axis after said spherical bearing has been positioned in said socket member.

9. The combination with a piston and a crank shaft of a connecting rod comprising two complementary sections having at opposite ends semi-spherical and semi-cylindrical bearing portions which coact when said sections are joined together to provide a spherical bearing and a cylindrical bearing for connection to said piston and crank shaft respectively, the joints between the bearing portions at opposite ends of said rod being disposed in planes approximately at right angles to each other so as to permit said semi-cylindrical portions to be separated sufficiently to receive said crank shaft after said spherical bearing has been secured in position within said piston.

10. The combination with a piston and a crank shaft of a connecting rod comprising two complementary sections having relatively flat shank portions and semi-spherical bearing portions which coact to provide a spherical bearing at one end of the rod, and a socket member within the piston adapted to receive said bearing, the joint between said bearing portions being disposed with respect to said shank portions so as to permit the last mentioned portions to be spread apart after said semi-spherical bearing portions have been assembled in operative position within the piston.

11. The combination with a crank shaft, of a connecting rod comprising two complementary sections having relatively flat shank portions and coacting bearing portions at one end thereof, and means for securing said section together comprising lugs projecting outwardly from said bearing portions, and a clip secured at one of its ends to said shank portions and having at its other end a hook engaging said lugs whereby to clamp them together.

12. The combination with a piston of a connecting rod comprising two complementary sections having bearing portions at one end thereof which coact when said sections are secured together to provide a spherical bearing, a socket member for said bearing, and a retaining member having a slot in one wall adapted to pass the shank of said rod and permit said socket member to be seated in the retaining member.

13. A socket for a connecting rod having a spherical bearing at one end thereof, said socket comprising a cup-shaped shell drawn from relatively thin metal stock and adapted to receive said bearing, the edges of said shell being adapted to be bent around said bearing to retain it in the socket.

14. A retainer for a connecting rod bearing comprising a cup-shaped member having a longitudinally extending slot in one of its sides, said slot being adapted to pass the shank of said connecting rod whereby to permit said bearing to be seated within the cup-shaped member.

In testimony whereof, I have hereunto affixed my signature.

ERNEST H. SHAFF.